United States Patent
Sugawara et al.

(10) Patent No.: US 7,210,723 B2
(45) Date of Patent: May 1, 2007

(54) ARTICLE HOUSING DEVICE FOR SMALL-SIZED VEHICLE

(75) Inventors: Yoshiharu Sugawara, Atlanta, GA (US); Yoshitake Yamada, Shizuoka (JP)

(73) Assignee: Yamaha Motor Manufacturing Corporation of America, Newnan, GA (US)

( * ) Notice: Subject to any disclaimer, the term of this patent is extended or adjusted under 35 U.S.C. 154(b) by 0 days.

(21) Appl. No.: 11/118,510

(22) Filed: Apr. 29, 2005

(65) Prior Publication Data

US 2006/0244280 A1    Nov. 2, 2006

(51) Int. Cl.
*B60R 7/06* (2006.01)

(52) U.S. Cl. .............................. 296/24.34; 296/37.12; 296/70; 224/483

(58) Field of Classification Search ............. 296/24.34, 296/37.8, 37.12, 70; 224/483
See application file for complete search history.

(56) References Cited

U.S. PATENT DOCUMENTS

| 5,489,121 | A | * | 2/1996 | Mohr ........................... 281/43 |
| 5,718,301 | A | * | 2/1998 | Williams .................... 180/65.1 |
| 6,170,787 | B1 | | 1/2001 | Morgan |
| 6,582,002 | B2 | * | 6/2003 | Hogan et al. ............. 296/37.12 |
| 2003/0071505 | A1 | * | 4/2003 | Ferrell, Jr. ................... 297/352 |
| 2003/0155786 | A1 | * | 8/2003 | Kim et al. .................. 296/24.1 |

* cited by examiner

*Primary Examiner*—Dennis H. Pedder
(74) *Attorney, Agent, or Firm*—Keating & Bennett, LLP

(57) ABSTRACT

An article housing device for a small-sized vehicle allows an occupant to easily insert and remove an article while seated on a seat, and is capable of preventing a liquid spilled from a housing portion from dropping down to a floor on which the occupant places his/her foot. A dashboard includes a lateral extended portion and a protruding portion protruding rearward from the lateral extended portion, in which a plurality of housing portions allowing articles to inserted into and removed from above the housing portions are formed in the protruding portion, and at least two of the housing portions are aligned in the vehicle longitudinal direction.

6 Claims, 13 Drawing Sheets

ARTICLE HOUSING DEVICE FOR SMALL-SIZED VEHICLE

BACKGROUND OF THE INVENION

1. Field of the Invention

The present invention relates, for example, to a small-sized vehicle such as a passenger golf cart, and more particularly, to an improvement in an article housing device such as a cup holder.

2. Description of the Related Art

Generally, a golf cart is structured so that a driver drives the golf cart by steering a steering wheel in straight ahead, rightward or leftward directions while seated on a seat. Such a golf cart is generally equipped with a cup holder to hold a bottle, a cup and so forth having drinking water or other beverages or liquids contained therein.

As an above-mentioned cup holder, there is one proposed in U.S. Pat. No. 6,170,787B1 that arranges two cup holders in a vehicle lateral direction in a dashboard disposed in front of the seat.

However, when a cup holder is arranged in a dashboard, a vehicle occupant has trouble reaching a cup or the like located in the cup holder when the occupant is still seated on the seat because the occupant is forced to insert and remove the cup to and from the cup holder by stooping his/her head, requiring an improvement in usability. Further, in the above-described arrangement of aligned cup holders in the vehicle lateral direction in a row, another problem is that it is impossible to have enough space for the number of cup holders in accordance with the number of occupants.

Another problem is that, when drinking water or the like spills out from the cup due to a rough road or terrain, the drinking water or the like drops down from the hole of the bottom wall of the cup holder to a vehicle floor on which the occupant places his/her foot to thereby contact and dampen the foot or a shoe of the occupant.

SUMMARY OF THE INVENTION

In order to overcome the problems described above, preferred embodiments of the present invention provide an article housing device for a small-sized vehicle that allows the occupant to insert and remove an article into and out of the article housing device easily while seated on a seat, and that allows a sufficient amount of space for cup holders or the like to be assured easily.

In addition, preferred embodiments of the present invention provide an article housing device that is arranged to prevent spilled drinking water or the like from dropping down to the vehicle interior floor from the cup or the like.

An article housing device for a small-sized vehicle according to a preferred embodiment of the present invention includes a dashboard, a steering column arranged to extend in a slanting manner upward from the lower portion of the dashboard to a vehicle interior side, and a seat device arranged rearward of the steering column, and the dashboard includes a lateral extended portion extending in a vehicle lateral direction and a protruding portion protruding rearward from the lateral extended portion, a plurality of housing portions allowing an article to be inserted into and removed from above are provided in the protruding portion, and at least two of the plurality of housing portions are aligned in a vehicle longitudinal direction.

According to a preferred embodiment of the present invention, the housing portions are provided in the protruding portion that is arranged to protrude rearward from the lateral extended portion, such that the occupant can easily reach the housing portions by hand without stooping his/her head while seated on the seat, so that the usability can be improved. Further, at least two of the plurality of housing portions are arranged along the vehicle longitudinal direction, so that an arrangement space for the number of housing portions in accordance with the number of the occupants can be assured easily.

According to one preferred embodiment of the present invention, the protruding portion includes a top surface wall portion extending rearward from the lateral extended portion and a rear wall portion extending downward from the rear end of the top surface wall portion, in which a housing portion is provided in the top surface wall portion.

In the present preferred embodiment, the housing portion is preferably provided in the top surface wall portion extending rearward, so that a structure that is easy for the occupant to reach, and insert and remove the articles is surely realized.

According to another preferred embodiment of the present invention, the top surface wall portion is detachable from the vehicle and includes the housing portions.

In the present preferred embodiment, the top surface wall portion together with the housing portions is arranged in a detachable manner, so that the replacement and cleaning of the housing portions are easy, and the replacement and maintenance of the parts disposed below the top surface wall portion are easy as well.

According to still another preferred embodiment of the present invention, the riding capacity of the seat device is two or more, the steering column is arranged in front of an end portion in the vehicle lateral direction of the seat device, and the protruding portion is arranged closer to the center side in the vehicle lateral direction relative to the steering column.

In the present preferred embodiment, the protruding portion is arranged to be closer to the center side in the vehicle lateral direction as compared to the steering column arranged in front of the end portion of the seat device, so that the housing portions can be arranged at a position to which the plurality of occupants can easily reach, respectively. Thus, every occupant of the vehicle can insert and remove articles from the housing portions without disturbance or interference by the steering column.

According to still another preferred embodiment of the present invention, a side housing portion is provided on a side of the protruding portion that is opposite to the steering column side in the vehicle lateral direction, and the side housing portion has an opening for insertion and removal of articles at the vehicle rear side thereof.

In the present preferred embodiment, it is easy to insert and remove articles especially for the vehicle occupants other than the driver.

According to still another preferred embodiment of the present invention, the protruding portion is arranged at a position that is distant from the steering column in the vehicle lateral direction, and the side housing portion, which has an opening arranged for insertion and removal of articles at the vehicle rear side thereof, is provided on the steering column side of the protruding portion in the vehicle lateral direction.

In the present preferred embodiment, it is easy to insert and remove the articles, especially for the driver, and the capacity for accommodating articles can be increased.

According to still another preferred embodiment of the present invention, the protruding portion includes a top surface wall portion extending rearward from the lateral extended portion and a rear wall portion extending downward from the rear end of the top surface wall portion, and an operation switch is arranged on the rear edge portion of the top surface wall portion or the rear wall portion.

In the present preferred embodiment, the operation switch is arranged on the rear edge portion of the top surface wall portion or the rear wall portion, allowing, the switch to be operated without disturbance or interference by the steering wheel, so that the operation of the switch is easier as compared to the case where the operation switch is arranged frontward or rearward of the steering wheel.

An article housing device for a small-sized vehicle according to another preferred embodiment of the present invention includes a dashboard, a steering column arranged to extend upward from the lower portion of the dashboard to a vehicle interior side in a slanting manner, a seat device arranged rearward of the steering column, and a floor portion extending from the seat device to the lower portion of the dashboard, in which the dashboard includes a lateral extended portion extending in a vehicle lateral direction and a protruding portion protruding rearward from the lateral extended portion, a housing portion allowing an article to be inserted into and removed from above is provided in the protruding portion, an opening to cause to flow downward a liquid spilled out into the housing portion is formed in a bottom wall of the housing portion, and a spill panel to receive and direct the spilled liquid outward of the floor portion is provided below the housing portion.

In the present preferred embodiment, the spill panel arranged to receive the liquid flowing down thereinto and lead the liquid outside of the floor portion is provided, so that the liquid spilled out from the housing portions is prevented from dropping down to the floor near the occupants' feet and to avoid contact with the foot or shoes of the occupants.

According to one preferred embodiment of the present invention, the protruding portion includes a top surface wall portion extending rearward from the lateral extended portion and a rear wall portion extending downward from the rear end of the top surface wall portion, and the spill panel includes a bottom wall formed by bending and extending the lower end portion of the rear wall portion frontward up to the front of the floor portion.

In the present preferred embodiment, the spill panel is defined by a portion of the bottom wall formed by bending and extending the lower end portion of the rear wall portion frontward up to the front of the floor portion, so that the number of the parts can be reduced as compared to the case of providing a totally separate spill panel.

The operation and effect, and the features, elements, characteristics and advantages of the present invention will be described in detail with respect to the preferred embodiments thereof based on the attached drawings described below.

DETAILED DESCRIPTION OF THE PREFERRED EMBODIMENTS

Figure 1:
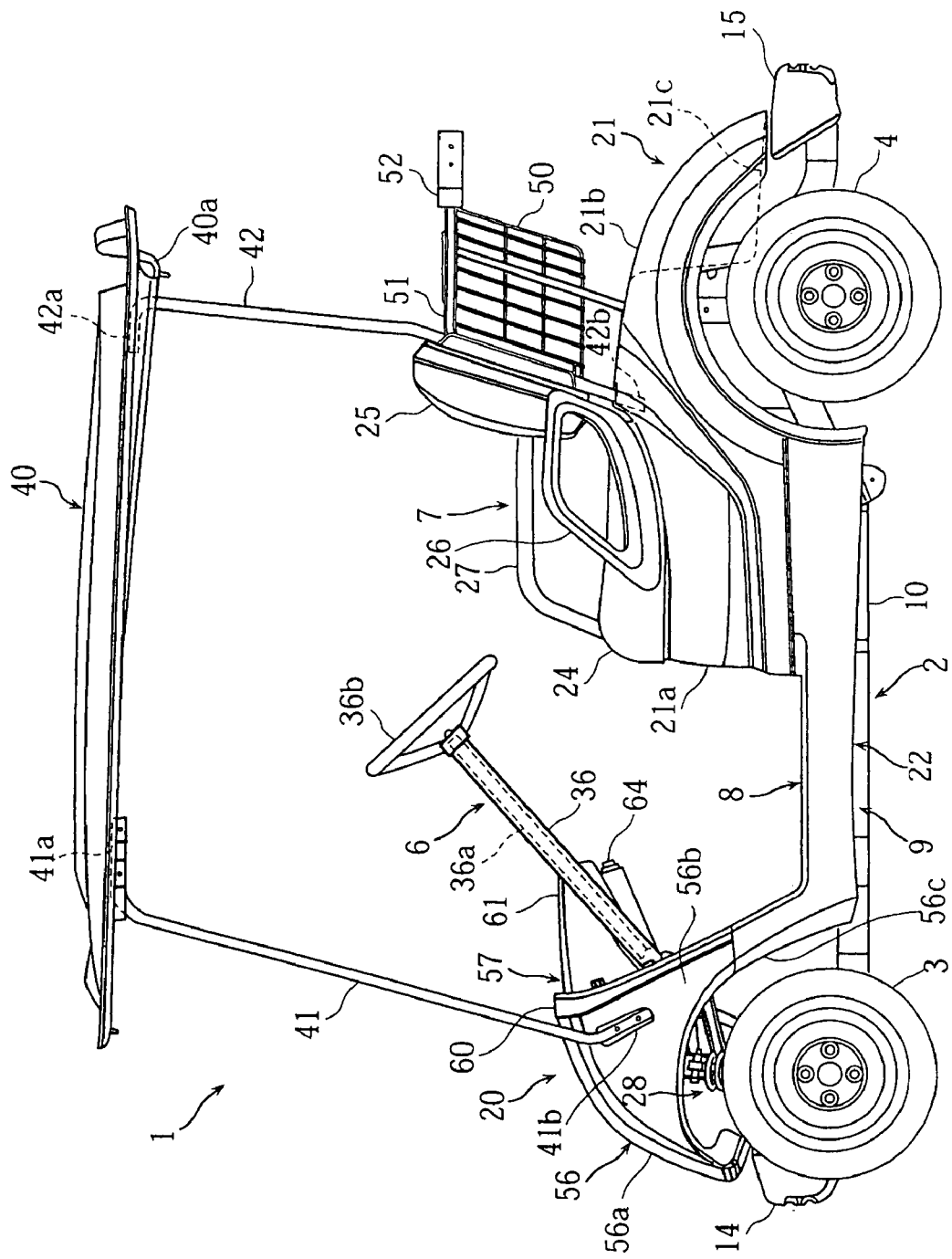
FIG. 1 is a left side view of a passenger golf cart (small-sized vehicle) equipped with an article housing device according to a preferred embodiment of the present invention.

Hereinafter, preferred embodiments according to the present invention will be described based on the attached drawings. FIGS. 1 to 15 are views for illustrating an article housing device of a passenger golf cart (small-sized vehicle) according to preferred embodiments of the present invention. Note that front, rear, left and right shown in the description of the preferred embodiments indicate the front, rear, left and right, respectively, when viewed from a vehicle occupant seated on a seat.

In the drawings, "1" denotes a passenger golf cart preferably for use on, for example, a golf course. The golf cart 1 includes a vehicle body frame 2 composing a skeleton structure thereof, left and right front wheels 3 arranged at left and right front end portions of the vehicle body frame 2, left and right rear wheels 4 arranged at left and right rear end portions of the vehicle body frame 2, a steering system 6 arranged between the left and right front wheels 3, a seat device 7 arranged rearward of the steering system 6, a power unit 5 arranged below the seat device 7, a floor panel 8 arranged above the vehicle body frame 2 between the front and rear wheels 3, 4 and, a roof 40 covering the area above a vehicle interior, and a vehicle body cover 9 covering the vehicle body.

The vehicle body cover 9 includes a front cover 20 covering the front portion of the body frame 2, a rear cover 21 covering the rear portion of the body frame 2, and side covers 22 covering the left and right portions between the front cover 20 and the rear cover 21, respectively.

The power unit 5 includes a gasoline engine 5a, a V-belt type continuously variable transmission 5b, and a differential gear 5c. Note that, needless to say, an electric motor can be alternatively used instead of the gasoline engine.

The body frame 2 includes left and right main frames 10 extending in a vehicle longitudinal direction and arranged at the left and right sides of the vehicle, respectively, and front, middle, and rear cross pipes 11, 12, 13 respectively coupling the front, middle and rear portions of the left and right main frames 10 with each other. The left and right main frames 10 and the front, middle and rear cross pipes 11, 12, 13 are preferably constituted by a substantially square pipe being longer than it is wide, respectively. Further, at the front and rear ends of the body frame 2, a front bumper 14 and a rear bumper 15 are mounted, respectively.

When viewed from the above, front portions 10a of the left and right main frames 10 are arranged to slant inward in the vehicle lateral direction so as to be located inside center portions 10b and rear portions 10crespectively, and so as to have a smaller width between the left and right main frames 10. Further, when viewed from the side, the front portions 10a of the left and right main frames 10 are arranged to slant slightly upward while the rear portions 10c thereof are arranged to bend upward in a curved manner.

The center portions 10b of the left and right main frames 10 are connected with a seat cross frame 16, and the rear portions 10c thereof are connected with a pair of forward and backward rear cross frames 17, 18, respectively, in which the seat cross frame 16 and the pair of forward and backward rear cross frame 17, 18 define a Π shape standing on the left and right main frames 10.

Between the seat cross frame 16 and the forward rear cross frame 17, the seat device 7 is mounted. The seat device 7 preferably includes a two-seater seat cushion 24 of a bench type, and a seat back 25 arranged at the rear edge of the seat cushion 24. The left half and right half of the seat cushion 24 are a driver seat and a front passenger or assistant driver's seat, respectively. Further, the seat cushion 24 is provided with armrests 26, 27 on the left and right outer end portions thereof.

The seat cushion 24 is supported by the seat cross frame 16 via a seat hinge (not shown) in a vertically openable and closable manner. Below the seat cushion 24, a battery (not shown) serving as a power source for the gasoline engine 5a is disposed.

At the front portions 10a of the left and right main frames 10, front and rear suspension brackets 30a, 30b are provided, and the lower portions of the front suspension brackets 30a and the rear suspension brackets 30b are coupled with a front suspension 28 supporting the left and right front wheels 3 in a vertically swingable manner, respectively.

Such portions of the left and right front portions 10a having the front suspension brackets 30a disposed thereon are connected with each other via a cross member 38 extending in the vehicle lateral direction. The cross member 38 is connected with an engaging bracket 39 extending upward, and an engaging hole 39a, which will be detailed later, is formed in the engaging bracket 39. Note that "38a" denotes a bumper bracket supporting the front bumper 14.

Further, at the rear sides of the left and right rear suspension brackets 30b, support posts 31 are arranged so as to stand on the front portions 10a of the main frames 10. The upper end portions of the left and right support posts 31 are connected with a crossbeam 32 extending in the vehicle lateral direction. The left and right ends of the crossbeam 32 are coupled with the left and right rear suspension brackets 30b, respectively, by left and right reinforcing members 29a, and the left and right rear suspension brackets 30b are coupled with each other by a reinforcing member 29b. The two reinforcing members 29a, the reinforcing member 29b and the crossbeam 32 form a substantially trapezoid configuration in a plan view.

When viewed from the vehicle side, the left and right end surfaces of the crossbeam 32 are connected with the vertically middle portions of front pipes 33 that are slightly slanting forward, respectively. When viewed from the vehicle side, the main frame 10, the support post 31, and a floor member secured to the front pipes 33, which will be described later, form a substantially triangular configuration.

A steering-supporting bracket 35 is connected at the left side portion in the vehicle lateral direction of the crossbeam 32 so as to support a steering column 36 of the steering system 6. The steering column 36 extends upwardly rearward to the vehicle interior side, and a steering shaft 36a is supported in a rotatable manner in the steering column 36. At the upper end of the steering shaft 36a, a steering wheel 36b is secured, and at the lower end thereof, the left and right front wheels 3 are coupled via a not-shown gear box and tie rod. The gear box is secured to a gear box bracket 37 connected to between the left and right front portions 10a.

The upper end portions of the left and right front pipes 33 are connected with a dash supporting member 34 extending in the vehicle lateral direction. The dash supporting member 34 preferably has a substantially arc-shaped configuration with an opening at the bottom when viewed from the vehicle front. Note that the lower ends of the left and right front pipes 33 are not connected to anything and are free.

A floor panel 8 preferably includes a foot panel portion 8a on which an occupant seated on the seat device 7 places his/her foot, a front panel portion 8b extending continuously from the front edge of the foot panel portion 8a to ascend upward in front of the occupant, and a rear panel portion 8c extending continuously from the rear edge of the foot panel portion 8b to extend to below the seat device 7. The foot panel portion 8a, the front panel portion 8b and the rear panel portion 8c are preferably made of resin and formed in a unified manner. The rear panel portion 8c preferably has a box shape with a top opening and accommodates the previously-described battery.

Both the foot panel portion 8a and the rear panel portion 8c are fastened, preferably via bolts, to the left and right main frames 10. Further, the front panel portion 8b is fastened, preferably via bolts, to the left and right front pipes 33.

On the driver seat side of the foot panel portion 8a, a recessed arrangement portion 8d for an accelerator pedal and a recessed arrangement portion 8e for a break pedal are formed. Further, on the driver seat side of the front panel portion 8b, a steering opening 8f is formed. The steering column 36 is inserted into and passed through the steering opening 8f, and a cover (not shown) is applied to define a blockade between the steering column 36 and the steering opening 8f.

The roof 40 is arranged above the body frame 2 (refer to FIG. 1). The roof 40 covers an area above the front cover 20, the floor panel 8, the seat device 7, and a rear cover 21. The roof 40 is preferably provided with drain holes 40a at the left and right rear end portions thereof to discharge rain water or the like pooled on the surface thereof.

Figure 2:
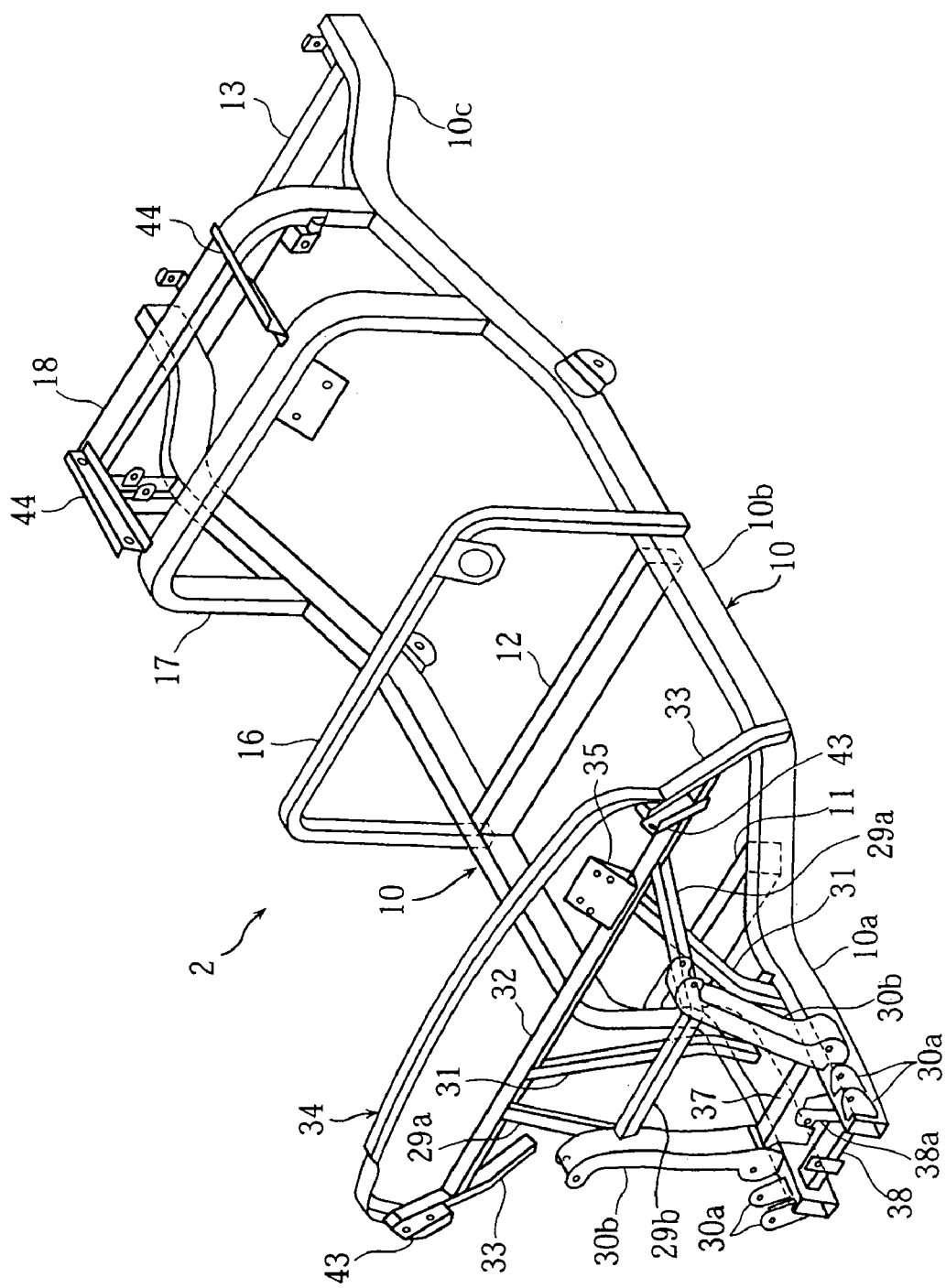
FIG. 2 is a perspective view of a vehicle body frame of the golf cart.
Figure 3:
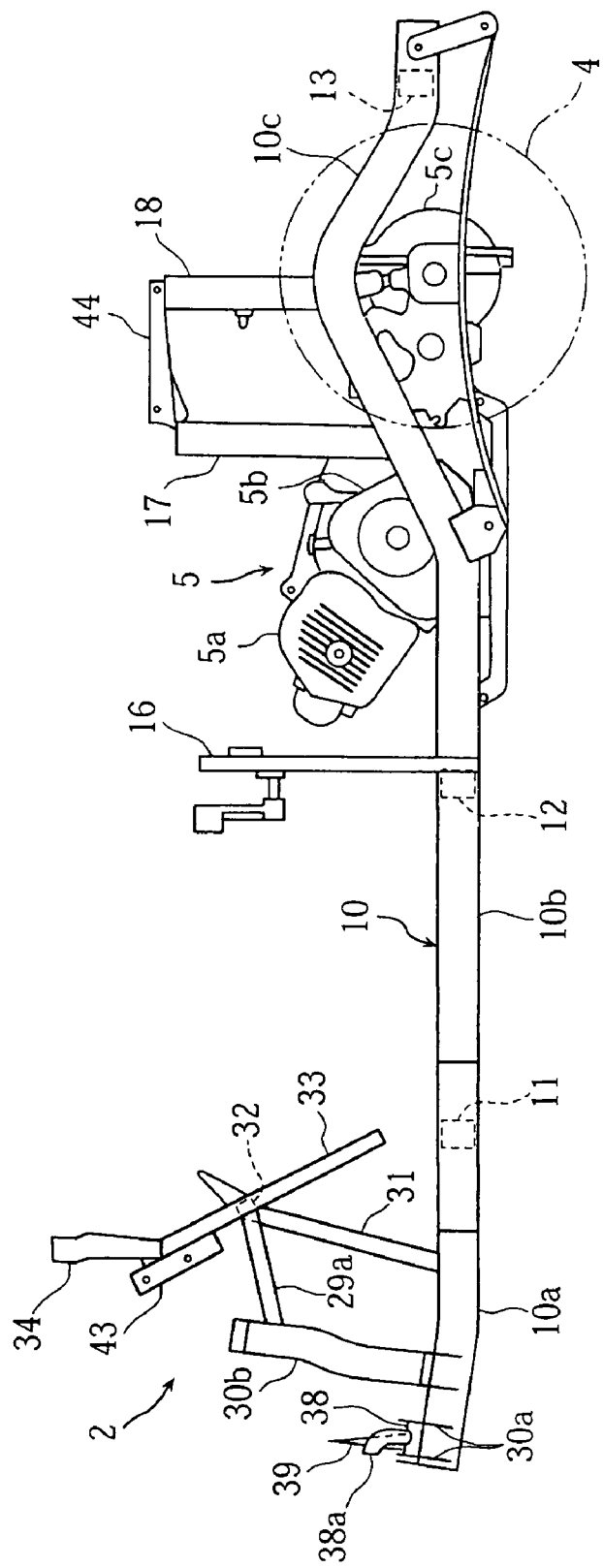
FIG. 3 is a left side view of the vehicle body frame.
Figure 4:
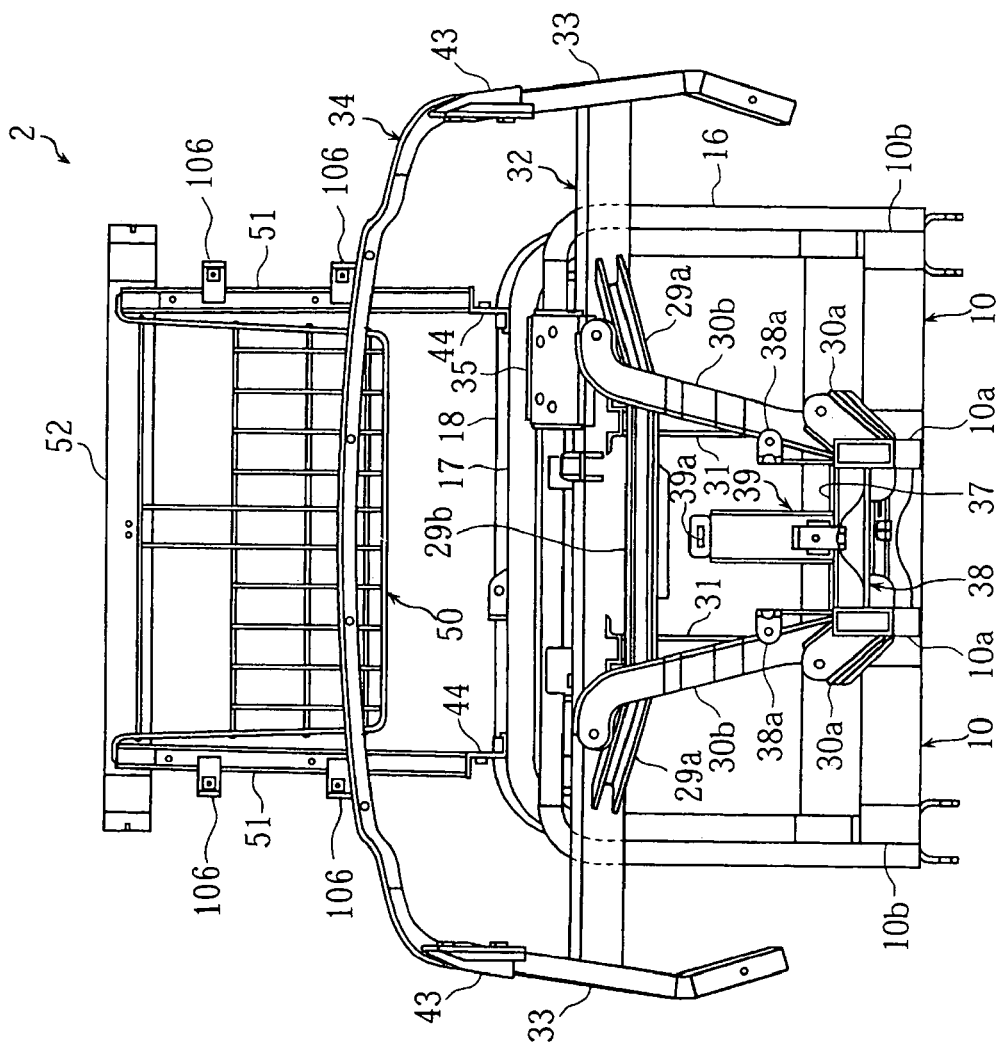
FIG. 4 is a front view of the vehicle body frame.
Figure 5:
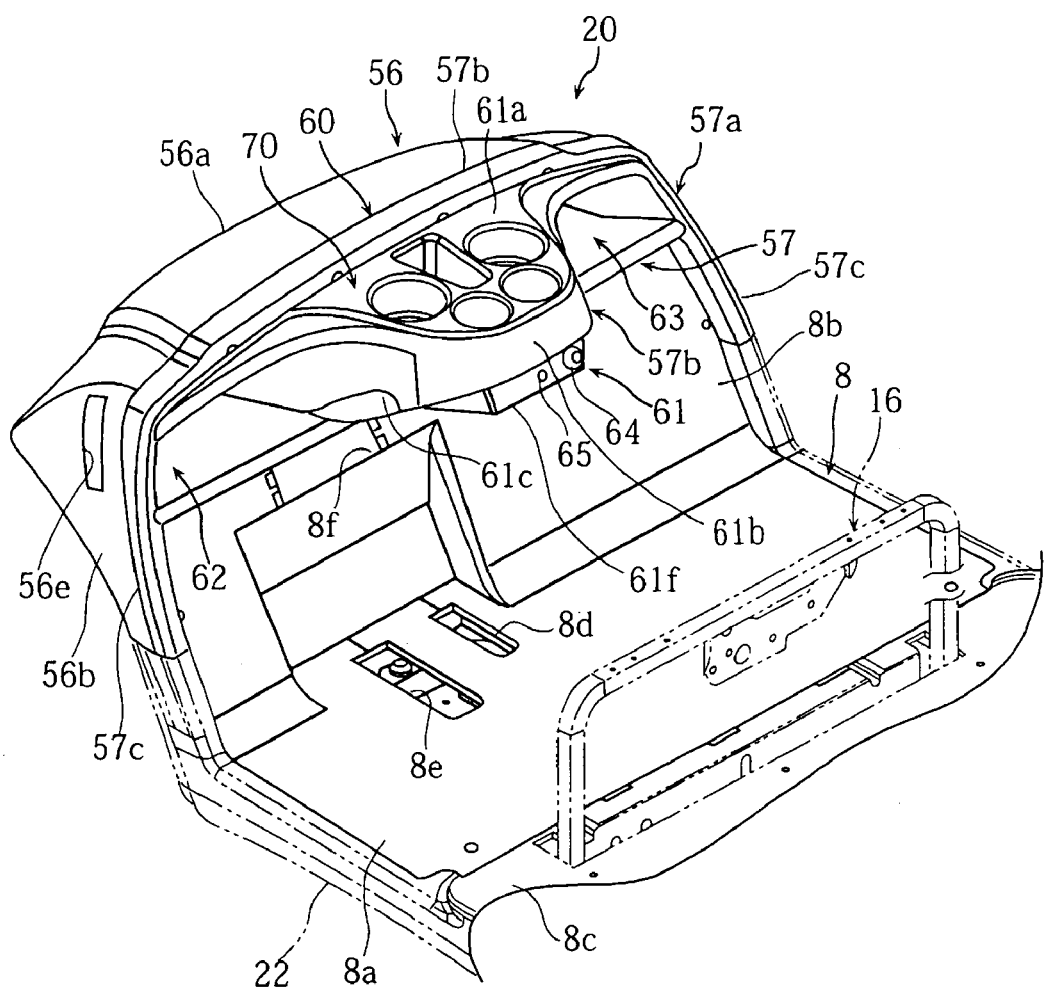
FIG. 5 is a perspective view of a front cover of the vehicle body frame.

As shown in FIGS. 1 to 3, the left and right front end portions of the roof 40 are connected to upper end portions 41a of front roof pillars 41 extending in the vertical direction, and the left and right rear end portions of the roof 40 are connected to upper end portions 42a of rear roof pillars 42 also extending in the vertical direction. Lower end portions 41b of the front roof pillars 41 are fastened preferably with bolts to left and right front roof brackets 43 connected with the left and right front pipes 33. On the top surfaces of the forward and backward rear cross frames 17, 18, left and right rear roof brackets 44 are joined so as to bridge the frames 17, 18. With the roof brackets 44, left and right stays 51 are fastened preferably with bolts, each of the left and right stays 51 is welded with upper and lower roof brackets 106. Lower end portions 42b of the left and right rear roof pillars 42 are fastened preferably with bolts to the roof brackets 106 arranged at the upper and lower portions of the left and right stays 51, respectively.

The rear cover 21 includes a seat cover portion 21a that is arranged so as to surround the lower front and left and right sides of the seat cushion 24, and a rear cowl portion 21b extending rearward from the seat cover portion 21a to cover an area above the left and right rear wheels 4, the seat cover portion 21a and the rear cowl portion 21b being formed in a unified manner.

The rear cowl portion 21b is provided with a recessed portion in the form of a golf bag rack 21c between the left and right rear wheels 4. On the backside of the seat back 25, a bucket 50 is arranged. The bucket 50 is secured to the left and right stays 51 and preferably fastened with bolts to the left and right rear roof pillars 42 and the left and right rear roof brackets 44, and a supporting member 52 fixedly supporting the golf bag is mounted between the rear ends of the left and right stays 51.

Here, a front cowl of the golf cart 1 according to the present preferred embodiment is mounted on the vehicle body under the structure in which a frame-side engaging portion of the front cowl is provided at the front portion of the vehicle frame, and a cowl-side engaging portion, which is disengagable from the frame-side engaging portion, is provided at the front end portion of the front cowl. The rear end portion of the front cowl is secured to a composing member of the dashboard while in the state that the cowl-side engaging portion of the front cowl is engaged with the frame-side engaging portion.

The shape and size of the front cowl is preferably set such that the front cowl is secured to the composing member of the dashboard by being deformed elastically.

Further, the front cowl is provided with a support-post through hole capable of inserting a support post for supporting the roof therethrough, in which the support post for supporting the roof is secured to the vehicle frame side by passing through the support-post through hole. In the support-post through hole, there is provided a rubber grommet having a shape and size that is sufficient to blockade the space between the through hole and the support post for supporting the roof.

The mounting structure of the front cowl will be described more specifically. The front cover 20 includes a front cowl 56 covering an area above the left and right front wheels 3, and a dashboard 57 covering the rear surface of the front cowl 56.

The front cowl 56 includes a cowl front surface portion 56a extending frontward from a front edge portion 57a of the dashboard 57 by curving downward, cowl side surface portions 56b extending along the left side and right side, respectively, and a cowl bottom surface portion 56d extending inward continuously from the lower edge of the cowl front surface portion 56a by being bent. Wheel arch portions 56c covering an area above the front wheels 3 are provided at the lower hem portions of the left and right-cowl side surface portions 56b.

A roof pillar through hole 56e extending substantially in the vertical direction is formed in each of the cowl side surface portions 56b. Through the roof pillar through holes 56e, the lower end portions 41b of the front roof pillars 41 are inserted, and are fastened preferably with bolts to the front roof brackets 43, respectively.

In the through hole 56e, a rubber grommet 58 covering an area between the through hole 56e and the front roof pillar 41 is attached, as shown in FIGS. 15A to 15C.

The grommet 58 is provided in a body portion 58a surrounding the through hole 56e and at the peripheral portion of the body portion 58a in a unified manner, and includes a sandwiching portion 58b sandwiching the peripheral portion of the through hole 56e. Further, in the body portion 58a, there are provided a substantially rectangular hole 58c and a slit 58d extending downward from the substantially rectangular hole 58c. The provision of such a slit 58d of the substantially rectangular hole 58c allows the assembling work to be simplified so that the rubber grommet 58 can be attached to the front cowl 56 in advance and the front roof pillars 41 can be mounted later.

On the cowl bottom surface portion 56d at the cowl front, a hook portion 56f protruding rearward is provided. The hook portion 56f is engagable with and disengagable from the engaging hole 39a of the engaging bracket 39. Further, at the rear edge portion of the front cowl 56, a plurality of mounting portions 56g protruding rearward are arranged at predetermined intervals in the vehicle lateral direction.

Figure 9:
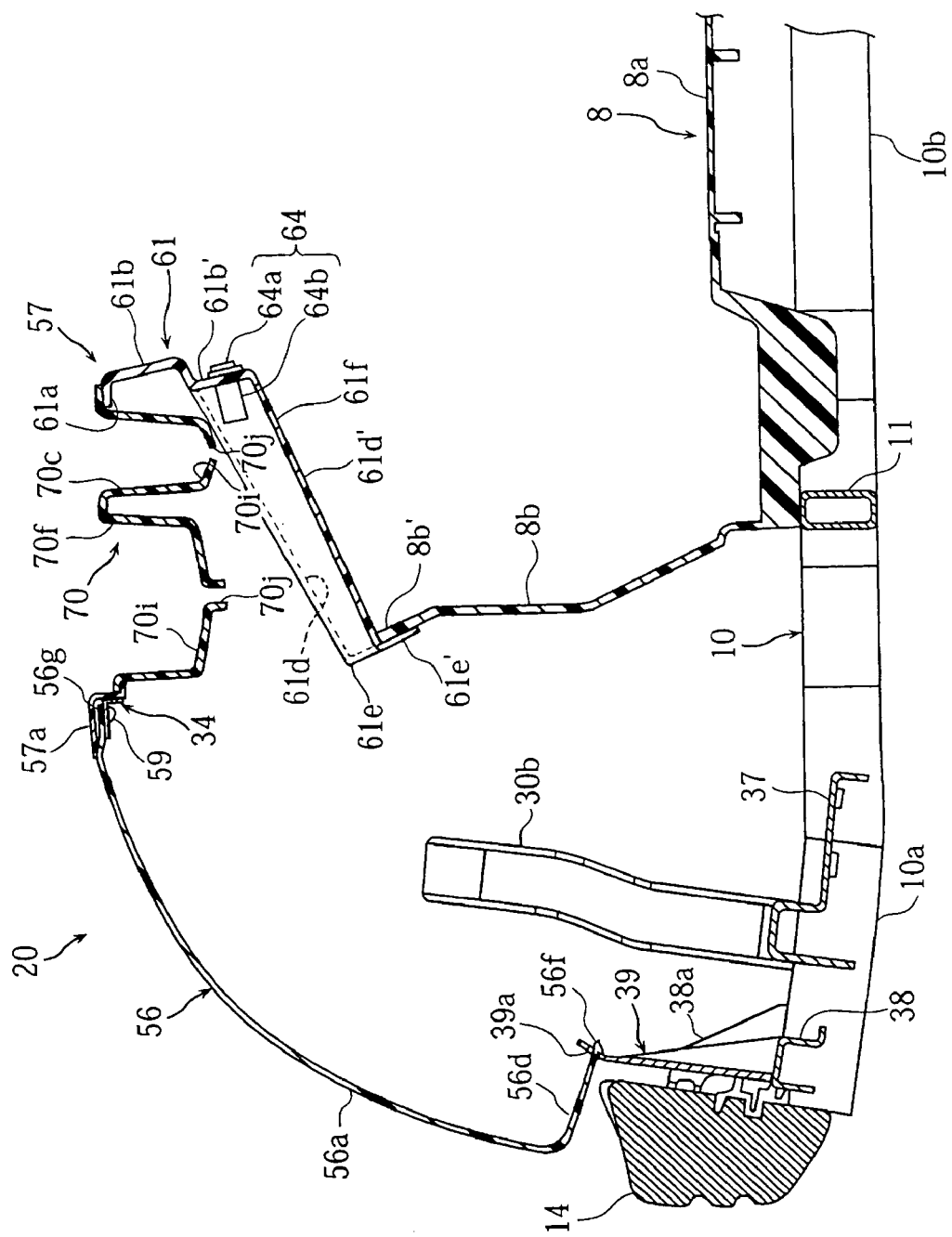
FIG. 9 is a sectional side view of the front cover.

Here, the shape and size of the front cowl 56 is set such that the front cowl 56 is positioned and secured to the body frame 2 by being deformed against its elastic force. Specifically, as shown in FIG. 9, the hook portion 56f of the front cowl 56 is inserted into and concurrently engaged with the engaging hole 39a of the engaging bracket 39, and then the respective mounting portions 56g are fastened to the dash supporting member 34 with fasteners 59 by elastically deforming the front cowl 56. Note that the respective mounting portions 56g may be fastened to a front edge potion 57a of the dashboard 57, or otherwise the respective mounting portions 56g may be fastened to the dash supporting member 34 together with the front edge potion 57a.

The dashboard 57 includes a lateral extended portion 60 extending in the vehicle lateral direction and a protruding portion 61 protruding rearward from a lateral center portion of the lateral extended portion 60, which are preferably made of resin and formed in a unified manner.

The lateral extended portion 60 includes an upper hem portion 57b composing the front edge potion 57a and extending in the vehicle lateral direction, and left and right lower hem portions 57c extending from both ends of the upper hem portion 57b downwardly and rearwardly in a slanting manner. The front edge potion 57a is fastened and secured to the dash supporting member 34. Further, the front end surfaces of the side covers 22 are connected to the lower end surfaces of the left and right lower hem portions 57c, respectively, as if they define a continuous surface.

Figure 6:
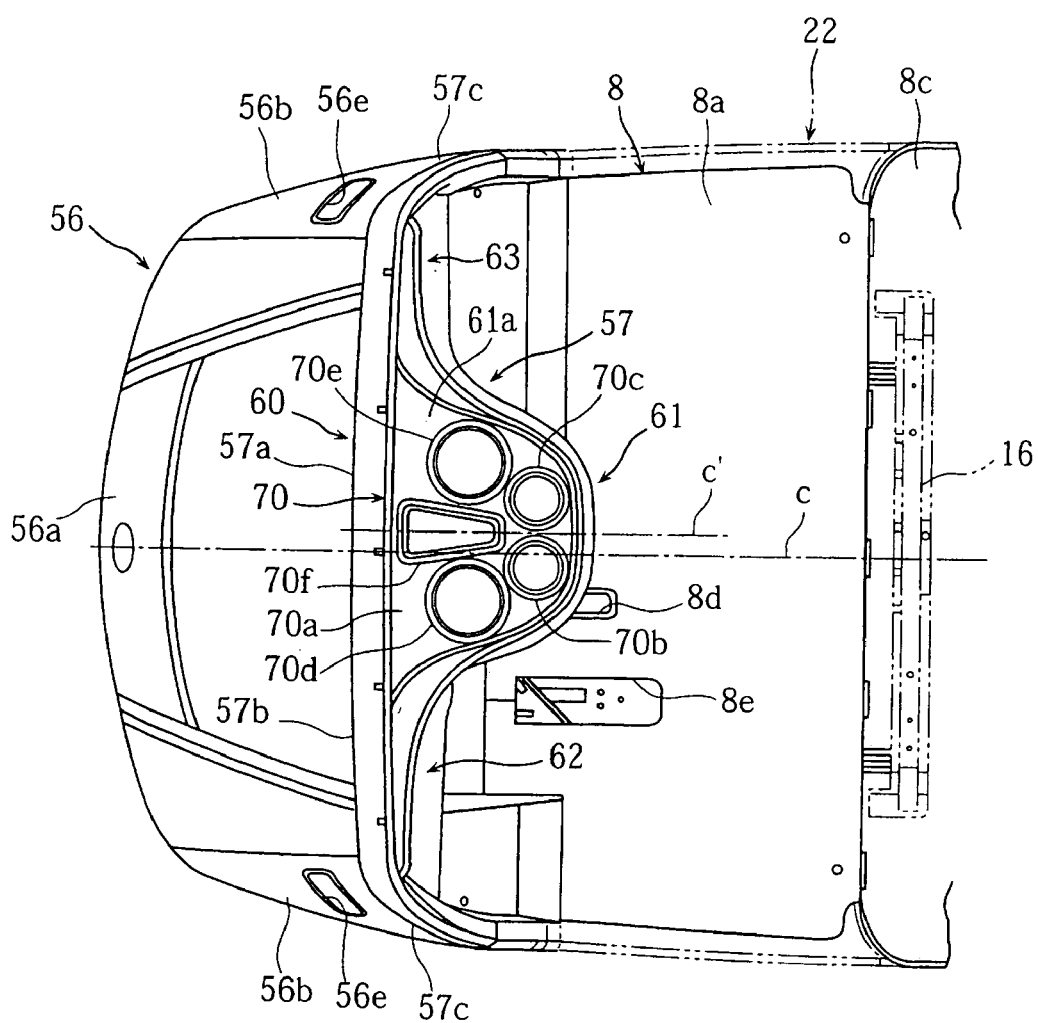
FIG. 6 is a plan view of the front cover.
Figure 7:
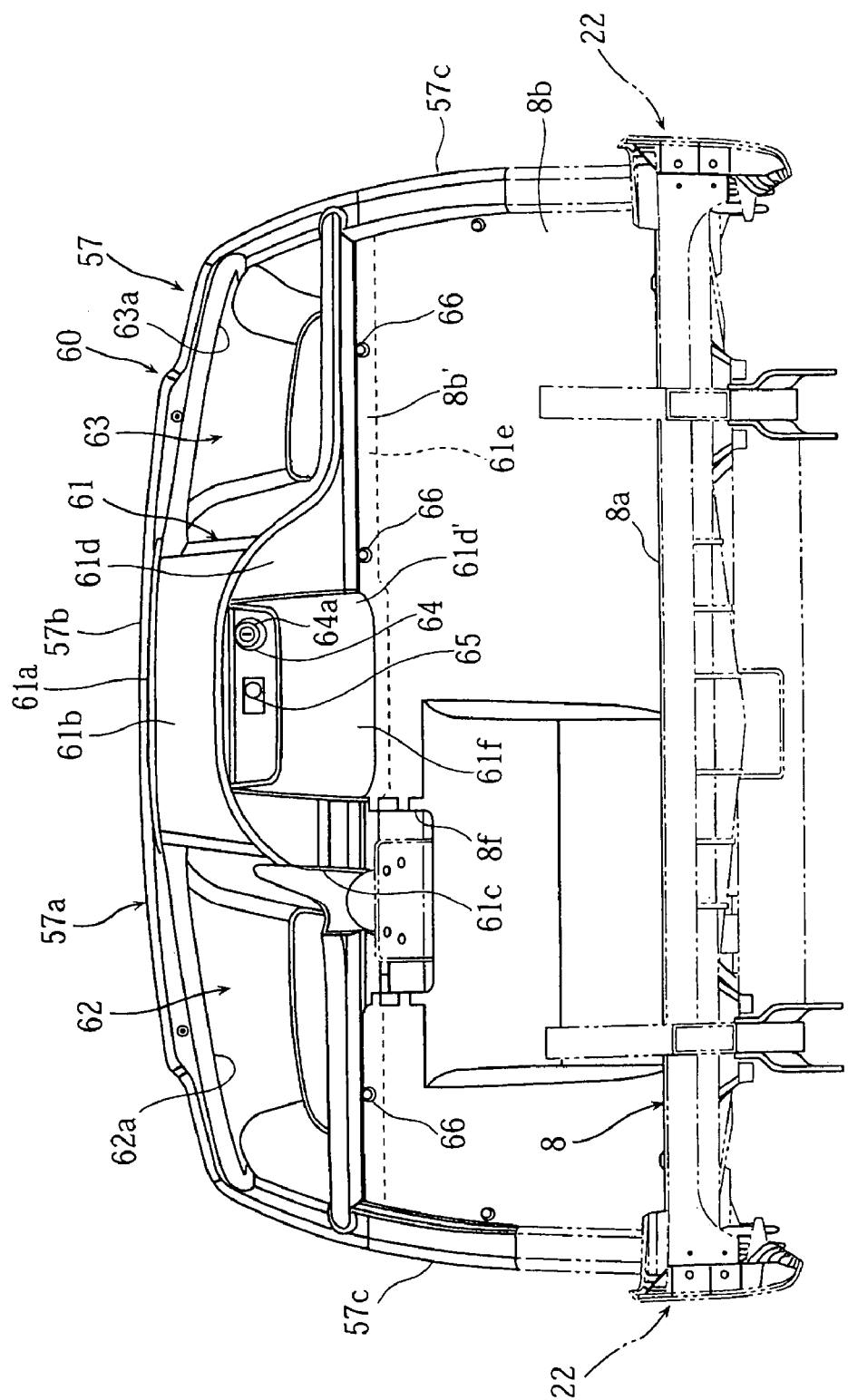
FIG. 7 is a rear view of the front cover.
Figure 8:
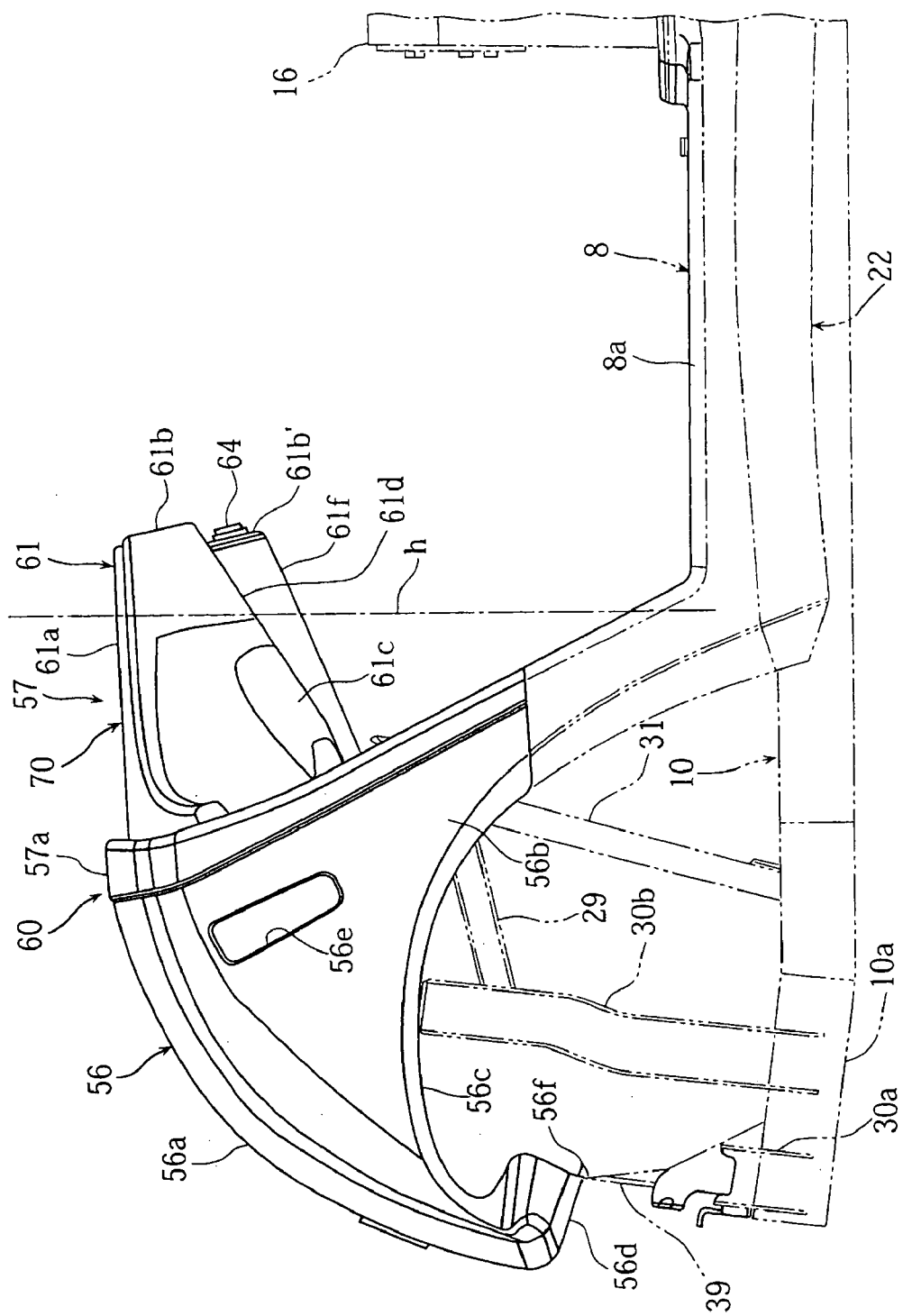
FIG. 8 is a left side view of the front cover.

As shown in FIG. 6, the protruding portion 61 is disproportionately formed such that the lateral center line "c'" of the protruding portion 61 is positioned slightly at the front passenger's or assistant driver's seat side (right side) in comparison with the vehicle center line "c". Further, as shown in FIG. 8, the rearward protruding amount of the protruding portion 61 is preferably set such that the rear end surface thereof rearwardly exceeds a pump line extending along the front end of the foot panel portion 8a. Specifically, the above-mentioned rear end surface is positioned ahead of the knees of the occupants seated on the seat cushion 24 with a slight space therebetween.

The protruding portion 61 includes a top surface wall portion 61a extending rearward from the lateral extended portion 60, a rear wall portion 61b extending continuously from the rear edge of the top surface wall portion 61a by being bent downward, and a bottom wall portion 61d extending from the lower edge of the rear wall portion 61b by being bent frontward and downward in a slanting manner.

At the frond edge of the bottom wall portion 61d, a flange portion 61e is arranged to bend downward, and the flange portion 61e is arranged in front of an upper edge portion 8b' of the front panel portion 8b. The front edge portion 8b' and the flange portion 61e are secured with a plurality of rivets 66, adhesives, or the like.

On the left and right side portions in the vehicle lateral direction of the protruding portion 61, left and right side housing portions 62, 63 preferably having a substantially cylindrical shape extending frontward are formed in a unified manner. The inside portions of the left and right side housing portions 62, 63, which are inside the rear ends of the top wall and the bottom wall in the vehicle lateral direction, extend in the vehicle rearward from the protruding portion 61. The inside portions curve such that they continue from the top surface wall portion 61a. Further, the rear end of the bottom wall and the rear end of the top wall compose wide article housing openings 62a, 63a opening rearward. Those portions except the top walls and bottom walls of the left and right side housing portions 62, 63, specifically side walls, are composed of an outer wall extending frontward from the left and right lower hem portions 57c of the lateral extended portion 60, a back wall extending in the vehicle lateral direction continuously from the front end portion of the outer wall, and an inside wall extending from the back wall to the rear wall portion 61b of the protruding portion 61, which are formed into to define a piece of a continuous wall that extends continuously from the lower hem portions 57c to the rear wall portion 61b of the protruding portion 61.

A recessed release portion 61c is provided on the left side portion of the rear wall portion 61b, and the steering column 36 is arranged along the recessed release portion 61c. Thus, the steering column 36 is arranged so as to depart from the protruding portion 61 leftward in the vehicle lateral direction.

A bulge 61f preferably having a substantially box shaped configuration extends from the bottom wall portion 61d and bulges downward and is located on the bottom wall portion 61d at the vehicle lateral center portion thereof. A rear wall portion 61 b' of the bulge 61f is formed continuously from the lower edge of the rear wall portion 61b so as to recess frontward. The rear wall portion 61b' has a bottom wall portion 61d' continuously extending from the lower edge thereof and extending frontwardly and downwardly in a slanting manner by being bent. On the front edge of the bottom wall portion 61d', the flange portion 61e' is extends downwardly by being bent, and the flange portion 61e' overlaps the upper edge portion 8b' of the front panel portion 8b from the front (refer to FIG. 9). As described later, the bottom wall portion 61d functions as a spill panel to discharge any spilled liquids such as drinking water frontward of the front panel portion 8b to outside the vehicle.

In the rear wall portion 61b', a pilot lamp 65 and a main switch 64 are arranged preferably substantially in parallel in the vehicle lateral direction. The main switch 64 includes a key loading slot 64a exposing rearward from the rear wall portion 61b', and a key cylinder 64b protruding frontward from the rear wall portion 61b' so as to be not viewable from outside. Note that the pilot lamp 65 and the main switch 64 may be arranged in the rear wall portion 61b above the rear wall portion 61b' or in the rear edge portion of the top surface wall portion 61a.

In the top surface wall portion 61a of the protruding portion 61, there is formed an opening 61a' extending substantially over the entire top surface wall portion 61a. In the rear, left, and right edge portions of the opening 61a', engaging holes 61g are formed at predetermined intervals. Further, in the front edge portion of the opening 61a', a pair of left and right engaging grooves 61h are formed (refer to FIG. 12).

In such a top surface wall portion 61a, an article housing member 70 is attached in a detachable manner. The article housing member 70 includes a base portion 70a arranged to cover the opening 61a' and a plurality (e.g., five) cup holder portions (housing portions) 70b to 70f defined by bulging parts of the base portion 70a that are arranged to bulge in a downward direction. Each of the respective cup holders 70b to 70f has a top opening, allowing an article to be inserted into and removed from above.

Figure 10:
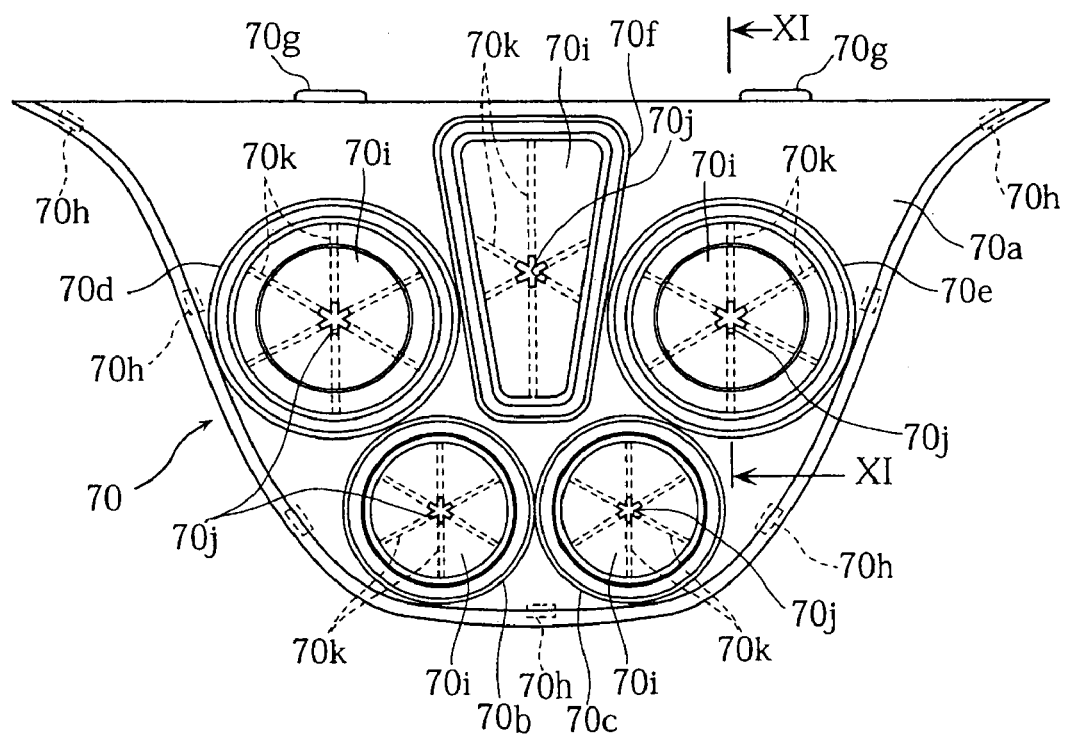
FIG. 10 is a plan view of a housing portion of the article housing device.
Figure 11:
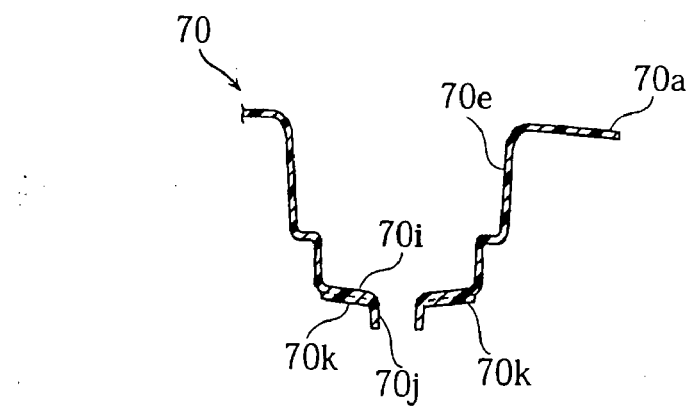
FIG. 11 is a sectional view of the housing portion (a sectional view taken along the XI—XI line in FIG. 10).
Figure 12:
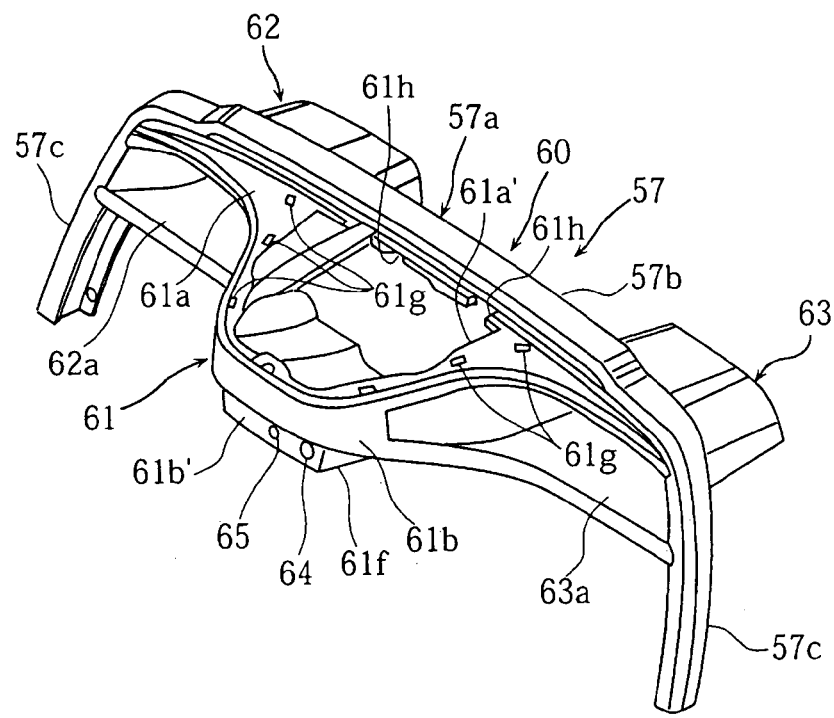
FIG. 12 is a perspective view of a dashboard composing the front cover.
Figure 13:
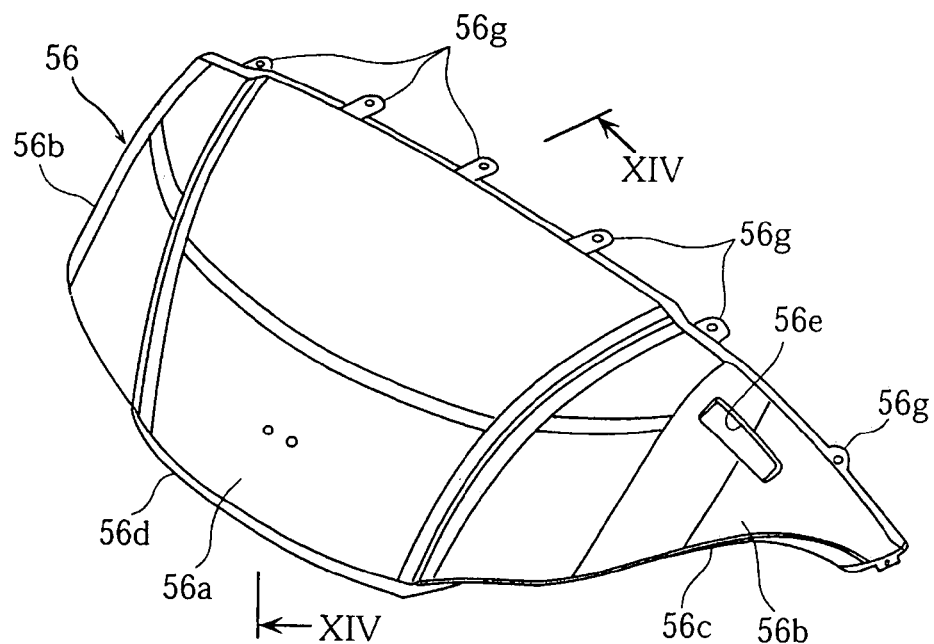
FIG. 13 is a perspective view of a front cowl composing the front cover.
Figure 14:
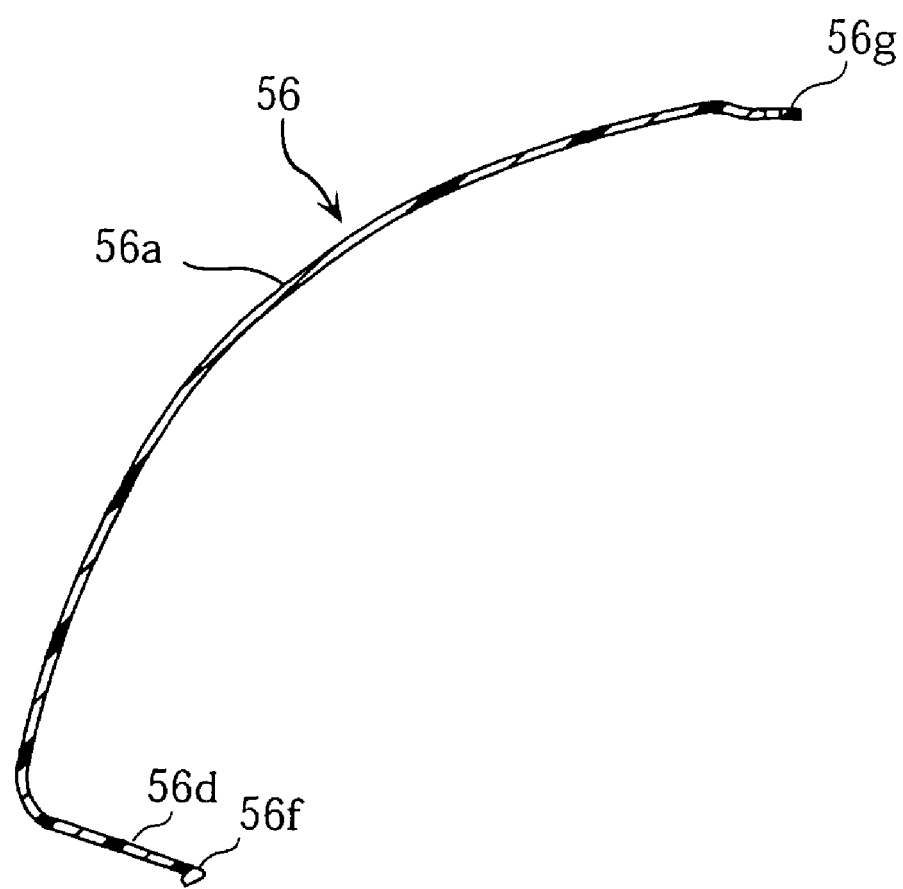
FIG. 14 is a sectional side view of the front cowl (a sectional view taken along the XIV—XIV line in FIG. 13).
Figure 15:
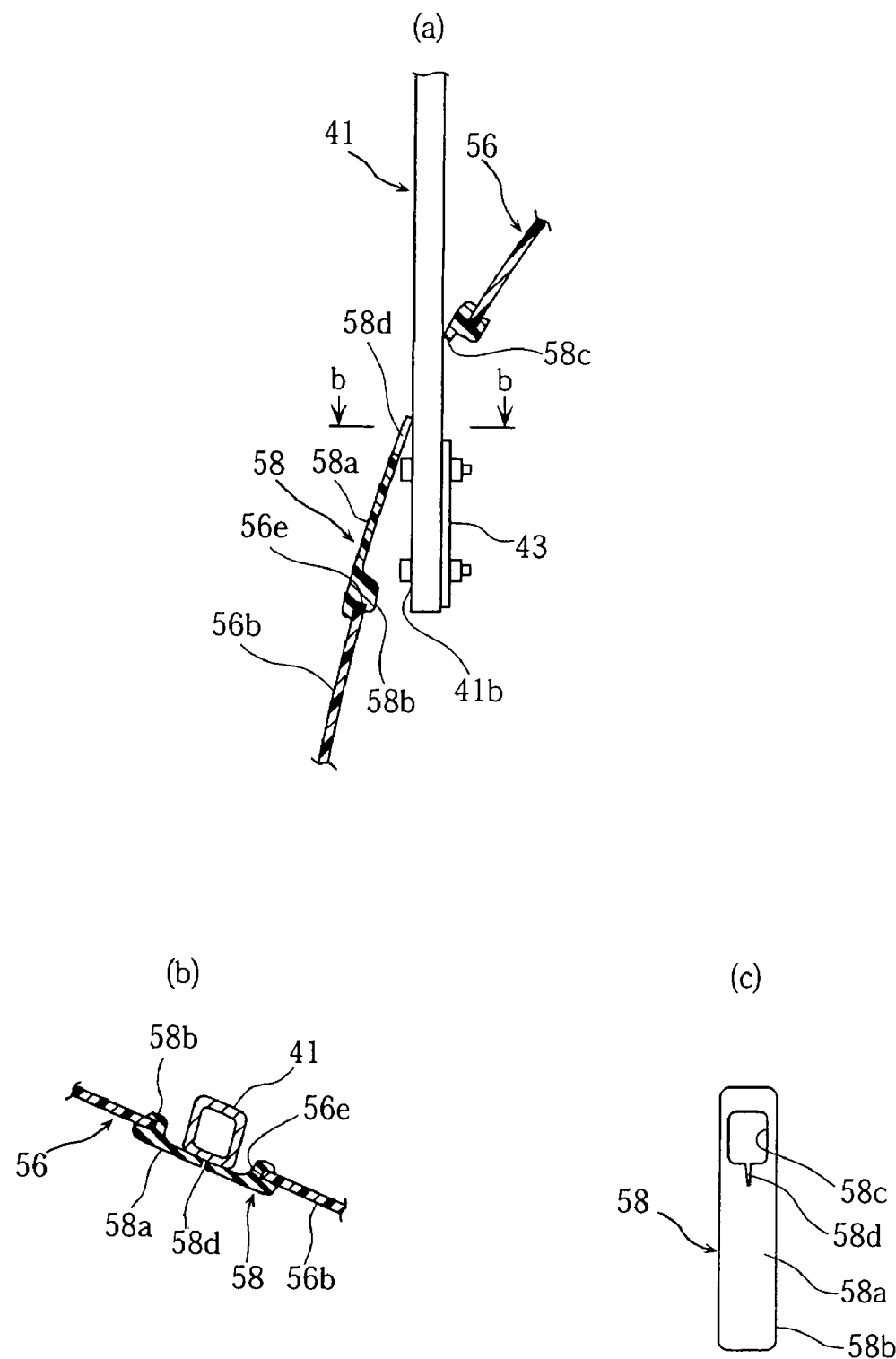
FIG. 15 is a sectional side view of a grommet loaded on the front cowl.

On the front edge portion of the base portion 70a, a pair of left and right engaging segments 70g, which are arranged to engage with the engaging grooves 61h, are arranged so as to protrude therefrom (refer to FIG. 10). Further, at those portions of the base portion 70a that correspond to the respective engaging holes 61g, claw portions 70h are arranged so as to protrude downward (refer to FIG. 11).

The article housing member 70 is mounted in and secured to the protruding portion 61 such that the respective engaging segments 70g are inserted into the engaging grooves 61h from the vehicle rear side to thereby position the article housing member 70 from the vertical, vehicle lateral, and vehicle front view points, and, in this state, the article housing member 70 is pushed from above, so that the respective claw portions 70h engage with the engaging holes 61g.

The respective cup holder portions 70b to 70f preferably include the left and right first cup holders 70b, 70c positioned at the rear end portion of the protruding portion 61, the left and right second cup holders 70d, 70e positioned in front of the left and right first cup holders 70b, 70c, and the center housing portion 70f positioned between the left and right second cup holders 70d, 70e. The first and second cup holders 70b to 70e are preferably arranged to have a substantially flat-bottomed cylindrical shape. Further, the second cup holders 70d, 70e are preferably arranged to have a diameter that is larger than those of the first cup holders 70b, 70c. The center housing portion 70f is preferably shaped to a have a flat-bottomed rectangle that is longer in a longitudinal direction thereof.

The first and second cup holders 70b, 70d on the left side, and the first and second cup holders 70c, 70e on the right side are preferably aligned almost in the longitudinal direction, respectively. Further, the left and right second cup holders 70d, 70e are preferably arranged disproportionately to the vehicle outer side as compared to the left and right first cup holders 70b, 70c, respectively. The respective first and second cup holders 70b to 70e are arranged in front of and in the vicinity of the knees of the occupant seated on the seat cushion 24, so that the occupant can insert and remove the cup, the plastic bottle, or the like easily while seated on the seat cushion 24.

The left and right first and second cup holders 70b to 70e and the center housing portion 70f each preferably has a bottom wall 70i having an inverted triangular pyramid shape with a slightly deeper center portion than the circumference thereof and also having an opening 70j formed at the bottom center thereof to allow any spilled material, liquid such as drinking water or the like to flow downward and out of the respective housing portion. Further, on the top surface of each of the bottom walls 70i, radial grooves oriented to the opening 70j are formed, and on the rear surface of each of the bottom walls 70i, a plurality of protruding portions 70k extending radially are formed as a rear wall of the radial grooves.

Below the first and second cup holders 70b to 70e and the center housing portion 70f, the bottom wall portion 61d' is arranged to define a spill panel. Any material, liquid such as drinking water, etc. spilled out into any of the housing portions travels along the bottom wall 70i and the radial grooves to the opening 70j so as to flow out from the opening 70j. The spilled material, liquid, drinking water and so forth flowing out from the opening 70j drops on the bottom wall portion 6' to flow downward along the bottom wall portion 61d' so as to be finally discharged to outside in front of the front panel portion 8b (refer to FIG. 9). Here, the key cylinder 64b is preferably arranged with its front end surface being positioned rearward of the opening 70j of the first cup holder 70c. Accordingly, the key cylinder 64b does not get wet with liquid, drinking water, etc. spilled out from the first cup holder 70c.

According to the present preferred embodiment, in the top surface wall portion 61a of the protruding portion 61 protruding rearward of the lateral extended portion 60 of the dashboard 57, the first and second cup holders 70b to 70e allowing articles such as a cup and a plastic bottle to be inserted into and removed from above are provided, so that the cup, the plastic bottle or the like can be placed at a position that is easily reachable by hand for the occupants. Hence, the occupants can easily insert and remove the cup, the plastic bottle, or the like without stooping while seated on the seat cushion 24, so that the usability can be improved.

Further, the left-side first and second cup holders 70b, 70d are preferably aligned in the longitudinal direction on the left side, and the right-side first and second cup holders 70c, 70e are preferably aligned in the longitudinal direction on the right side, so that the space for arranging the housing portions can be assured easily even if the housing portions in accordance with the number of occupants are arranged as compared to the case arranging the cup holders in a row in the vehicle lateral direction.

The article housing member 70 having the respective housing portions 70b to 70f disposed therein is preferably arranged in the protruding portion 61 in a detachable manner, so that the replacement or maintenance thereof can be performed by simply removing the article housing member 70.

Further, the riding capacity of the seat device 7 is two or more (for example, two persons), and the steering column 36 is arranged in front of a driver to be seated on the end portion in the vehicle lateral direction of the seat cushion 24 of the seat device 7. The protruding portion 61 is arranged closer to the center side in the vehicle lateral direction as compared to the steering column 36. Therefore, the protruding portion 61 is to be arranged at the center portion in the vehicle lateral direction, so that the articles can be accommodated at an easily reachable place for the driver as well as the other occupants, allowing improvement in the usability. Particularly, the articles can be brought in and out at the driver's seat side without disturbance or interference by the steering column 36.

According to the present preferred embodiment, on the side of the protruding portion 61 that is opposite to the steering side in the vehicle lateral direction, the side housing portion 63 having the article housing opening 63a with an opening at the rear thereof is provided, allowing the occupants especially other than the driver to longitudinally move articles in and out with ease.

Further, according to the present preferred embodiment, the protruding portion 61 is preferably located at a position that is distant from the steering column 36 in the vehicle lateral direction, and the housing portion 62 having the article housing opening 62a at the rear thereof is located at the steering column side in the vehicle lateral direction of the protruding portion 61. Accordingly, it is easy especially for the driver to insert and remove the articles, and the capacity for accomadating articles is increased.

The main switch 64 is preferably arranged on the rear wall portion 61b' of the protruding portion 61. As a result, it is easy to operate the switch without disturbance or interference by the steering wheel 36b. In other words, when the main switch is arranged on the front or rear of the steering wheel of the steering column, it is difficult to operate the switch due to the disturbance or interference by the steering wheel.

According to the present preferred embodiment, the bottom wall portion 61d' disposed below the respective housing portions 70b to 70f defines a spill panel arranged to receive any material, liquid such as drinking water, or the like, that flows down from the openings 70j of the respective housing portions 70b to 70f, to thereby lead the spilled liquid, drinking water or the like to the outside of the floor panel 8 and outside of the vehicle. Thus, it is possible to prevent the material, liquid such as drinking water or the like that is spilled out from the housing portions 70b to 70f from dropping down to the floor panel 8 near the occupant's foot, preventing the occupant's foot or shoes from being contacted and dampened by the spilled liquid.

Further, the spill panel is preferably defined by the bottom wall portion 61d' which is formed by bending and extending the rear wall portion vehicle frontward up to the front of the floor portion, so that the number of the parts can be reduced as compared to the case of providing a completely separate and independent spill panel.

According to the present preferred embodiment, the hook portion 56f is provided at the front end portion of the front cowl 56, and the front cowl 56 is mounted by securing its respective mounting portions 56g to the dash supporting member 34 of the body frame 2 while the hook portion 56f is in engaged with the engaging hole 39a of the engaging bracket 39 of the body frame 2, so that the assembling work to mount the front cowl 56 can be performed easily.

Further, the front cowl 56 is preferably secured to the dash supporting member 34 by being elastically deformed, such that the front cowl 56 can be improved in the rigidity. As a result, bouncing and displacement can be prevented.

The front cowl 56 has the through holes 56e arranged to have the front roof pillars 41 inserted therethrough, so that the front roof pillars 41 can be secured to the front roof brackets 43 of the body frame 2 without cutting into the front cowl 56.

Moreover, the through holes 56e are covered by the rubber grommet 58, so that the appearance can be prevented from being deteriorated.

The present invention may be embodied in other specific forms without departing from the spirit or essential characteristics thereof.

The present preferred embodiments are therefore to be considered in all respects as illustrative and non-restrictive, the scope of the invention being indicated by the appended claims rather than by the foregoing description, and all changes which fall within the meaning and range of equivalency of the claims are therefore intended to be embraced therein.

What is claimed is:

1. An article housing device for a small-sized vehicle comprising:
   a dashboard;
   a steering column arranged to extend from a lower portion of said dashboard to a vehicle interior side in a slanting manner;
   a seat device arranged rearward of said steering column; and
   a floor portion extending from said seat device to the lower portion of said dashboard; wherein
   said dashboard includes a lateral extended portion extending in a vehicle lateral direction and a protruding portion protruding rearward from the lateral extended portion;

a housing portion arranged to allow an article to be moved into and out of the housing portion from above is provided in the protruding portion;

an opening arranged to cause a liquid that is spilled out into the housing portion to flow downwardly is provided in a bottom wall of the housing portion; and a spill panel arranged to receive and lead the spilled liquid from the opening outward of the floor portion is provided below the housing portion; wherein the protruding portion includes a top surface wall portion extending rearward from the lateral extended portion and a rear wall portion extending downward from the rear end of the top surface wall portion, and the spill panel includes a bottom wall defined by bending and extending a lower end portion of the rear wall portion frontward up to a front of the floor portion.

2. The article housing device for the small-sized vehicle according to claim 1, wherein a riding capacity of said seat device is at least two, said steering column is arranged in front of an end portion in the vehicle lateral direction of said seat device, and the protruding portion is located closer to a center in the vehicle lateral direction relative than said steering column.

3. The article housing device for the small-sized vehicle according to claim 2, wherein a side housing portion is provided on a side of the protruding portion that is opposite to the steering column side in the vehicle lateral direction, the side housing portion has an opening arranged to allow an article to be inserted into and removed from the side housing portion at the vehicle rear side thereof.

4. The article housing device for the small-sized vehicle according to claim 3, wherein the protruding portion is arranged at a position that is distant from said steering column in the vehicle lateral direction, and the side housing portion is located on the steering column side of the protruding portion in the vehicle lateral direction, and the side housing portion has an opening arranged to allow an article to be inserted into and removed from the side housing portion at the vehicle rear side thereof.

5. The article housing device for the small-sized vehicle according to claim 1, wherein an operation switch is arranged on the rear edge portion of the top surface wall portion or the rear wall portion.

6. The article housing device for the small-sized vehicle according to claim 1, wherein the housing portions are detachable relative to the protruding portion.

* * * * *